(12) United States Patent
Roberts et al.

(10) Patent No.: US 9,565,484 B2
(45) Date of Patent: *Feb. 7, 2017

(54) APPARATUS AND METHOD FOR MANAGING MARKETING

(71) Applicant: AT&T INTELLECTUAL PROPERTY I, LP, Atlanta, GA (US)

(72) Inventors: Linda Roberts, Boynton Beach, FL (US); E-Lee Chang, Mableton, GA (US); Ja-Young Sung, San Jose, CA (US); Natasha Barrett Schultz, Suwanee, GA (US); Robert King, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,741

(22) Filed: Jun. 24, 2015

(65) Prior Publication Data

US 2015/0296270 A1   Oct. 15, 2015

Related U.S. Application Data

(63) Continuation of application No. 14/277,093, filed on May 14, 2014, now Pat. No. 9,098,867, which is a continuation of application No. 12/613,635, filed on Nov. 6, 2009, now Pat. No. 8,760,469.

(51) Int. Cl.
*G09G 5/00* (2006.01)
*H04N 21/81* (2011.01)
(Continued)

(52) U.S. Cl.
CPC ........ *H04N 21/812* (2013.01); *G06Q 30/0243* (2013.01); *G06Q 30/0251* (2013.01);
(Continued)

(58) Field of Classification Search
CPC   G09G 5/14; G09G 2340/10; G09G 2340/125; G06T 11/60; G06T 15/503
See application file for complete search history.

(56) References Cited

U.S. PATENT DOCUMENTS 5,223,924 A   6/1993   Strubbe
5,552,994 A   9/1996   Cannon et al.
(Continued)

OTHER PUBLICATIONS

"http://www.chrisharrison.net/projects/collaboratv/CollaboraTV_Harrison.pdf, 2008."
(Continued)

*Primary Examiner* — Abderrahim Merouan
(74) *Attorney, Agent, or Firm* — Guntin & Gust, PLC; Joseph Hrutka

(57) ABSTRACT

A method that incorporates teachings of the present disclosure may include, for example, the steps of transmitting media content to a group of set top boxes for presentation with an overlay superimposed onto the media content, receiving a first comment from a first set top box of the group of set top boxes where the first comment is presentable with the overlay and the media content by the group of set top boxes, determining a first advertisement based on the first comment, and transmitting the first advertisement to the first set top box for presentation with the overlay and the media content. Other embodiments are disclosed.

20 Claims, 12 Drawing Sheets

(51) Int. Cl.
*H04N 21/4788* (2011.01)
*H04N 21/488* (2011.01)
*H04N 21/6405* (2011.01)
*G06Q 30/02* (2012.01)
*G09G 5/14* (2006.01)
*G06T 11/60* (2006.01)
*G06T 15/50* (2011.01)

(52) U.S. Cl.
CPC ..... *G06Q 30/0269* (2013.01); *G06Q 30/0277* (2013.01); *H04N 21/4788* (2013.01); *H04N 21/4882* (2013.01); *H04N 21/6405* (2013.01); *G06T 11/60* (2013.01); *G06T 15/503* (2013.01); *G09G 5/14* (2013.01); *G09G 2340/10* (2013.01); *G09G 2340/125* (2013.01)

(56) References Cited

U.S. PATENT DOCUMENTS

| | | |
|---|---|---|
| 5,920,694 A | 7/1999 | Carleton |
| 6,272,231 B1 | 8/2001 | Maurer |
| 6,357,042 B2 | 3/2002 | Srinivasan |
| 6,438,579 B1 | 8/2002 | Hosken |
| 6,567,797 B1 | 5/2003 | Schuetze |
| 6,580,811 B2 | 6/2003 | Maurer |
| 6,732,146 B1 | 5/2004 | Miyake |
| 6,792,412 B1 | 9/2004 | Sullivan |
| 6,948,131 B1 | 9/2005 | Neven |
| 7,031,931 B1 | 4/2006 | Meyers |
| 7,051,352 B1 | 5/2006 | Schaffer |
| 7,200,857 B1 | 4/2007 | Rodriguez et al. |
| 2002/0010759 A1 | 1/2002 | Hitson et al. |
| 2002/0059094 A1 | 5/2002 | Hosea |
| 2002/0097265 A1 | 7/2002 | Kurapati |
| 2002/0162107 A1 | 10/2002 | Gutta |
| 2002/0178057 A1 | 11/2002 | Bertram |
| 2002/0193066 A1 | 12/2002 | Connelly |
| 2002/0194586 A1 | 12/2002 | Gutta |
| 2002/0199194 A1 | 12/2002 | Ali |
| 2003/0066068 A1 | 4/2003 | Gutta |
| 2003/0101450 A1 | 5/2003 | Davidsson |
| 2003/0182663 A1 | 9/2003 | Gudorf |
| 2003/0234805 A1 | 12/2003 | Toyama |
| 2004/0003392 A1 | 1/2004 | Trajkovic |
| 2004/0064526 A1 | 4/2004 | Lee |
| 2005/0108767 A1 | 5/2005 | Ma |
| 2005/0144632 A1 | 6/2005 | Mears |
| 2005/0149974 A1 | 7/2005 | Norman |
| 2006/0020614 A1 | 1/2006 | Kolawa |
| 2006/0168150 A1 | 7/2006 | Naik |
| 2006/0190966 A1 | 8/2006 | McKissick |
| 2006/0218481 A1 | 9/2006 | Adams Jr. |
| 2006/0259355 A1 | 11/2006 | Farouki |
| 2006/0271953 A1 | 11/2006 | Jacoby |
| 2006/0271997 A1 | 11/2006 | Jacoby |
| 2006/0288041 A1 | 12/2006 | Plastina |
| 2007/0011039 A1 | 1/2007 | Oddo |
| 2007/0136233 A1 | 6/2007 | Rege |
| 2007/0263984 A1 | 11/2007 | Sterner et al. |
| 2007/0266304 A1 | 11/2007 | Fletcher et al. |
| 2008/0028023 A1 | 1/2008 | Locke |
| 2008/0066016 A1 | 3/2008 | Dowdy |
| 2008/0148317 A1 | 6/2008 | Opaluch |
| 2008/0222295 A1 | 9/2008 | Robinson |
| 2008/0259906 A1 | 10/2008 | Shkedi |
| 2008/0275769 A1 | 11/2008 | Shao |
| 2008/0312949 A1 | 12/2008 | Nagasaka et al. |
| 2008/0313570 A1 | 12/2008 | Shamma et al. |
| 2008/0319643 A1 | 12/2008 | Shah |
| 2008/0319852 A1 | 12/2008 | Gardner |
| 2009/0228359 A1 | 9/2009 | Cameron et al. |
| 2009/0249223 A1* | 10/2009 | Barsook .................. H04N 7/15 715/753 |
| 2009/0299843 A1* | 12/2009 | Shkedi .................. G06Q 30/02 705/14.25 |
| 2009/0313097 A1 | 12/2009 | Chatterjee |
| 2010/0005393 A1 | 1/2010 | Tokashiki et al. |
| 2010/0287033 A1 | 11/2010 | Mathur |
| 2010/0306655 A1 | 12/2010 | Mattingly et al. |
| 2011/0145753 A1 | 6/2011 | Prakash |
| 2011/0159956 A1 | 6/2011 | Itskov |
| 2012/0050788 A1 | 3/2012 | Bachman |
| 2012/0081356 A1 | 4/2012 | Filippov |
| 2012/0198334 A1 | 8/2012 | Surin et al. |
| 2012/0271883 A1 | 10/2012 | Montoya |
| 2012/0331404 A1 | 12/2012 | Buford |
| 2013/0110649 A1 | 5/2013 | Sugiura et al. |
| 2013/0117109 A1 | 5/2013 | Busch |
| 2013/0130719 A1 | 5/2013 | Busch |

OTHER PUBLICATIONS

Chorianopoulos, "Content-Enriched Communication—Supporting the Social Uses of TV", 10-page article, The Journal of the Communications Network, vol. 6, Part 1, Jan.-Mar. 2007, 10 pages.

Coppens, "AmigoTV: Towards a Social TV Experience", Alcatel Bell R&I Residential Networked Applications, 4-page article, Apr. 1, 2004.

Georgia Tech, "Avatar Theater—Experimental TV Lab at Georgia Lab", 2-page article, http://etv.gatech.edu/ projects/avatar-theater/, web site last visited Jan. 20, 2010.

Khadraoui, "Interactive TV Show Based on Avatars", IEEE: Systems Communications, 2005, Proceedings, Aug. 17, 2005, pp. 192-197.

Luyten, "Telebuddies: Social Stitching with Interactive Television", Hasselt University—Transnationale Universiteit Limburg, Belgium, 6-page article, CHI 2006, Apr. 22-27, 2006.

Nathan, "CollaboraTV: Making Television Viewing Social Again", pp. 85-94, axTV'08, Oct. 22-24, 2008.

Oehlberg, "Designing for Distributed, Sociable Television Viewing", Stanford University, Mechanical Engineering, Palo Alto Research Center, 10-page article, May 2006.

Weisz, "Watching Together: Integrating Text Chat with Video", Carnegie Mellon University/University of Minnesota, 10-page article, CHI 2007, Apr. 28-May 3, 2007.

www.youtube.com, "Netflix Party on XBox Live", 3-page article, http://www.youtube.com/watch? v= _FuPxEC8Tfc &feature=related, web site last visited Jan. 20, 2010.

www.youtube.com, "NXE Dashboard, Aug. 11 Update Preview Program—Netflix Party", 2-page article, http://www.youtube.com/watch?v=2brb-gCt2ss, web site last visited Jan. 20, 2010.

* cited by examiner

500

600

700

900

1000

1100

1200

1300

US 9,565,484 B2

APPARATUS AND METHOD FOR MANAGING MARKETING

CROSS-REFERENCE TO RELATED APPLICATIONS

This application is a Continuation of and claims priority to U.S. patent application Ser. No. 14/277,093, now U.S. Patent Publication No. 2014/0249931, which is a Continuation of and claims priority to U.S. patent application Ser. No. 12/613,635, now U.S. Pat. No. 8,760,469. The contents of each of the foregoing are hereby incorporated by reference into this application as if set forth herein in full.

FIELD OF THE DISCLOSURE

The present disclosure relates generally to marketing and more specifically to an apparatus and method for managing marketing.

BACKGROUND OF THE DISCLOSURE

Effective marketing campaigns often rely upon a strong understanding of the audience to which they are directed. Surveys, demographic data and the like can be used by marketing personnel in their efforts to sell or otherwise market their products and services. In media programming, advertisement selection is often based upon the time of day (for example prime time) or the expected number of viewers.

DETAILED DESCRIPTION OF THE DRAWINGS

One embodiment of the present disclosure can entail a server having a controller to transmit media programming to a group of set top boxes for presentation with an overlay superimposed onto the media programming, receive a first comment generated at a first set top box of the group of set top boxes during presentation of the media programming, receive a second comment generated at a second set top box of the group of set top boxes during presentation of the media programming where the first and second comments are associated with the media programming and are presentable in the overlay during presentation of the media programming, analyze the first comment to determine a first marketing parameter, transmit a first advertisement to the first set top box for presentation with the overlay where the first advertisement is determined based on the first marketing parameter, analyze the second comment to determine a second marketing parameter, transmit a second advertisement to the second set top box for presentation with the overlay, where the second advertisement is determined based on the second marketing parameter, where the first and second advertisements are different from each other and shown in temporal proximity to each other by the corresponding first and second set top boxes during presentation of the media programming.

Another embodiment of the present disclosure can be a method including transmitting media content to a group of set top boxes for presentation with an overlay superimposed onto the media content, receiving a first comment from a first set top box of the group of set top boxes where the first comment is presentable with the overlay and the media content by the group of set top boxes, determining a first advertisement based on the first comment, and transmitting the first advertisement to the first set top box for presentation with the overlay and the media content.

Yet another embodiment of the present disclosure can entail a computer-readable storage medium operating in a first set top box of a group of set top boxes, where the storage medium is embedded with computer instructions to present media content, present an overlay superimposed onto the media content where the overlay is presentable by a second set top box of the group of set top boxes, receive an input of a first comment at the first set top box, present the first comment in the overlay where the first comment is presentable in the overlay by the second set top box, receive a first advertisement where the first advertisement is selected based on an analysis of the first comment, and present the first advertisement with the overlay and the media content.

Figure 1:
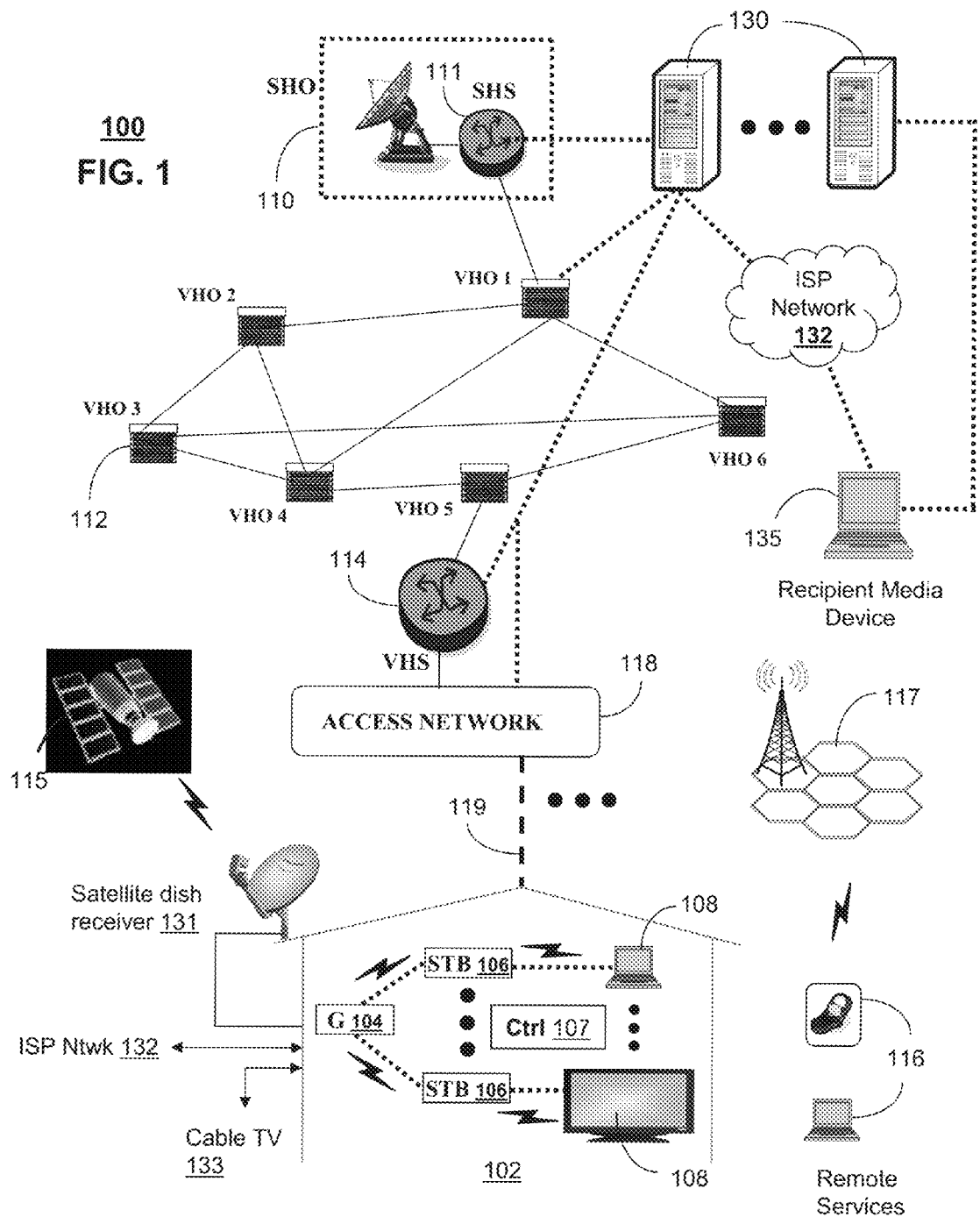
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a recipient media device 135. The recipient media device 135 can be configured to operate in an iTV network, which can include, but is not limited to including, IPTV, interactive cable television, and interactive satellite television. Additionally, the recipient media device 135 can be communicatively linked to the ISP network 132, the one or more computing devices 130, and to other devices in the system 100. Furthermore, the recipient media device 135 can be a STB, mobile device, personal computer, telephone, personal digital assistant (PDA), or other device capable of requesting, receiving, and transmitting media content.

Operatively, the recipient media device 135 can be configured to transmit a request for media content or media programming, as well as user-generated comments associated with the media content. The media content can be video content, audio content, still image content, text content, and other types of content. For example, the content can be previews for audio and video content, advertisements, and promotional content. The various devices in the system 100 can be configured to relay and/or receive the requests from the recipient media device 135. Such devices can include, but are not limited to including, the computing devices 130, the STBs 106, media devices 108, and wireless communications device 116. The recipient media device 135 can be also be configured to receive requests for media content and/or user-generated comments associated with the media content that is received at the recipient media device 135. Once the requests are received, the recipient media device 135 can relay the media content and/or the user-generated comments to the requesting devices.

Another distinct portion of the computing devices 130 can function as a server (herein referred to as server 130). The server 130 can use common computing and communication technology to perform the function of receiving and processing media content, user-generated comments, and data. The server 130 can be configured to have access to or maintain a client program. In one embodiment, the server 130 can enable the devices in the system 100 to access the client program and/or download the client program from the server 130 or otherwise. The client program itself can be configured to present an overlay that can be superimposed onto media content presented at a device utilizing the client program. Additionally, the client program can allow users to display comments on the presented media content, which can be seen amongst the users.

Once the client program has received comments from users commenting on the presented media content, the client program can transmit the media content and/or comments to the server 130 for processing. The server 130 can then be configured to determine marketing parameters of the media content based on the user-generated comments. The marketing parameters can include, but are not limited to including, demographic parameters, psychographic parameters, popularity parameters, and promotional effectiveness parameters. The content of the comments can also be analyzed to determine the effectiveness of the media content. Based on the various values determined for parameters of the media content and/or the analyzed comments, the media content can be improved or otherwise altered to satisfy the needs of a target marketing segment. The improved and/or altered content can then be transmitted to a device in the system 100.

Additionally, the server 130 can be configured to receive requests for the media content and the user-generated comments associated with the media content from the devices in the system 100, such as the recipient media device 135 and the STBs 106. Furthermore, the server 130 can relay and/or store the actual media content and/or the user-generated comments associated with the media content.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
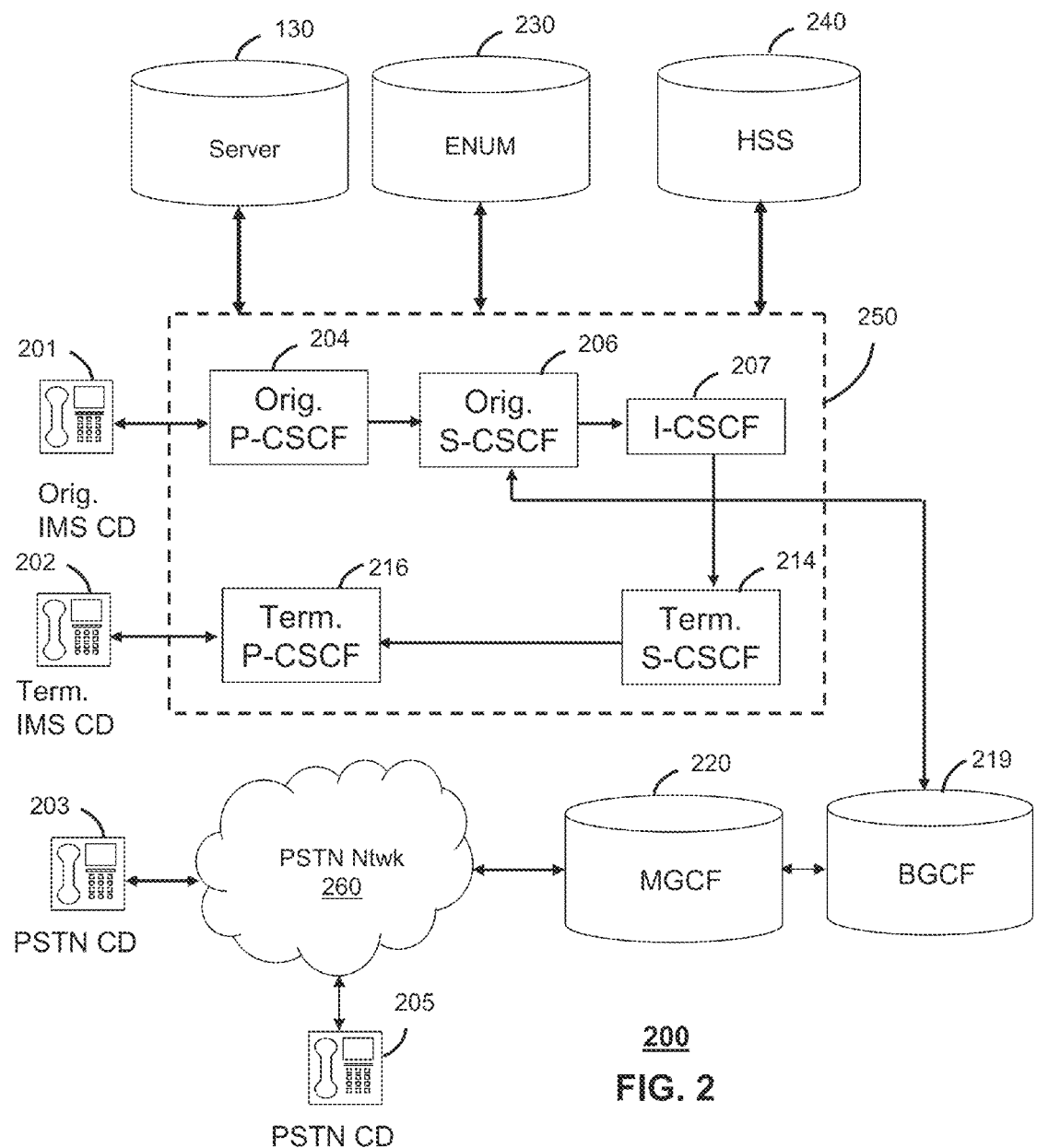

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The server 130 of FIG. 1 can be operably coupled to the second communication system 200 for purposes similar to those described above.

Figure 3:
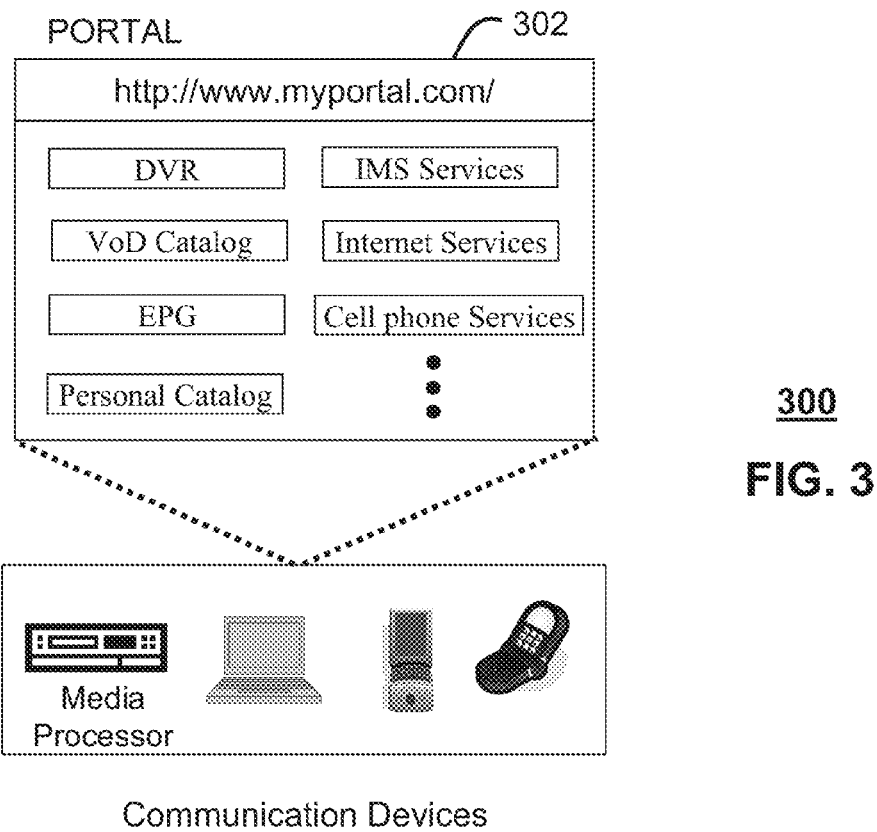
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
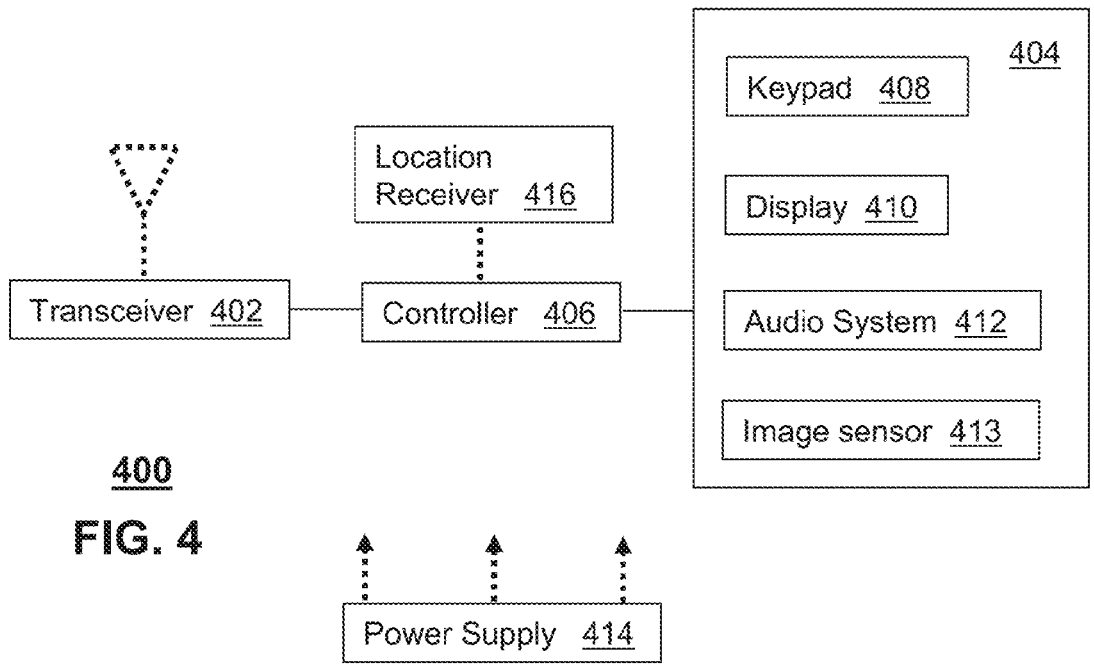
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
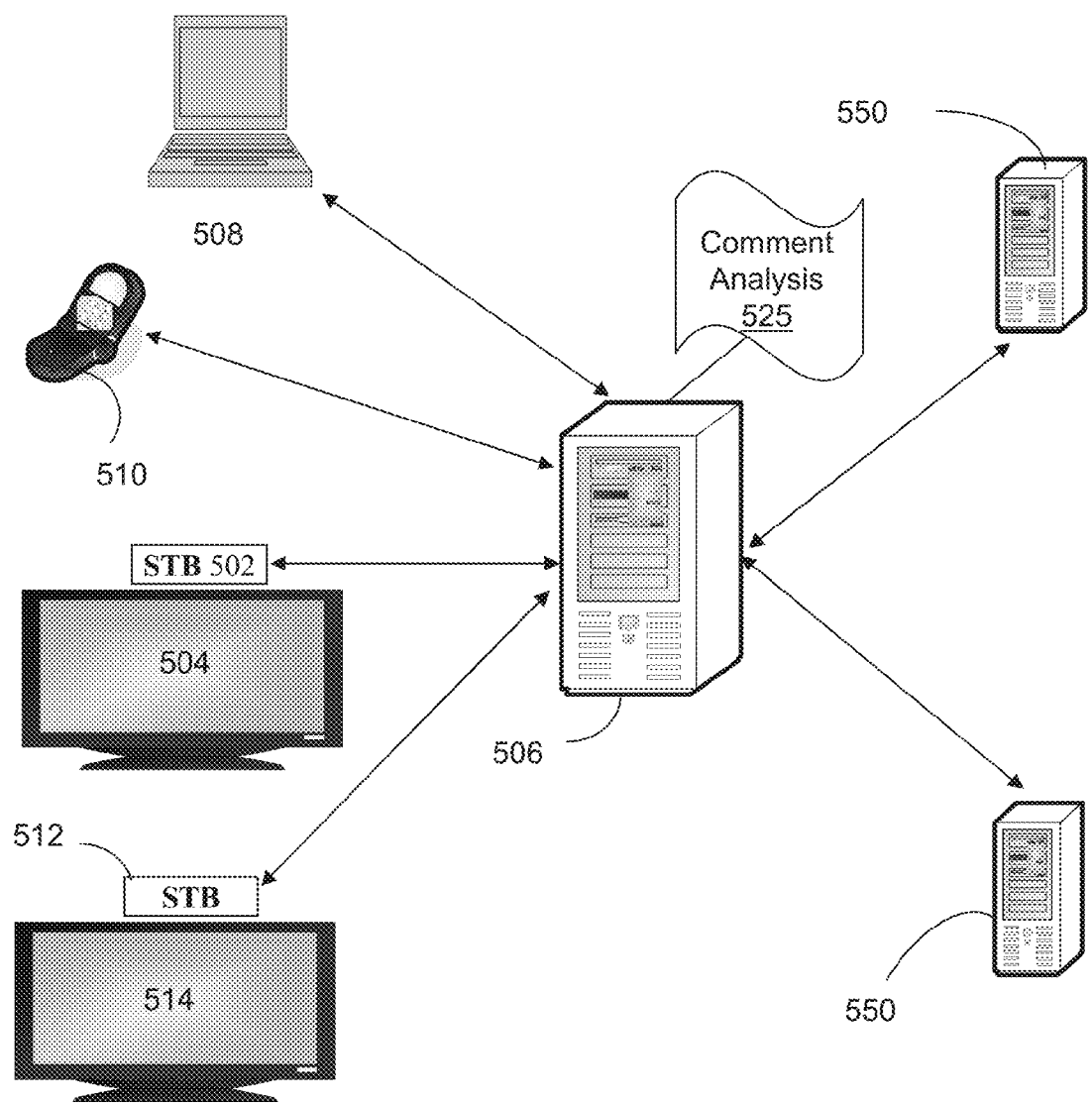
FIG. 5 depicts an illustrative embodiment of a system for managing marketing, the system operable in the communications systems of FIGS. 1-2.

FIG. 5 depicts an illustrative embodiment of a system 500 for targeted marketing, the system 500 being operable in portions of the communications systems of FIGS. 1-2. The system 500 can include a media device 502, which can be configured to deliver media content and data to display device 504. The media device 502 can be a STB, personal computer, mobile device, or other similar device. The display device 504 can be a monitor, television, cellular phones, personal digital assistants (PDA), computers, or other device capable of displaying media content. System 500 can also include a server 506. The server 506 can be in communication with the media device 502 and the other devices of the system 500. Notably, the server 506 can include or have access to a client program, which can be configured to present an overlay that can be superimposed onto media content that is displayed and/or received at the devices in the system 500. The client program can be utilized to receive comments from users utilizing the devices in the system 500 and to transmit the comments to the server 506. While the present disclosure describes the use of a remote client program that is accessible by the media devices, the present disclosure contemplates other technique and components for presenting an overlay at a group of set top boxes so that the users of the set top boxes can experience comparable viewing at remote locations while sharing their experiences.

Additionally, the system 500 can include a computing device 508, a communications device 510, and a media device 512. The computing device 508 can be a personal computer, laptop, or other similar device. The communications device 510 can include, for example, a mobile device, a cellular phone, wireless device, or other communications device. The media device 512 can be much like media device 502 and can be a STB, personal computer, mobile device, or other similar device. Also, the media device 512 can be operably coupled to a display device 514, which like display device 504, can be a monitor, television, or other display device capable of presenting media content. The devices in the system 500 can be configured to operate in an iTV network, which can include IPTV, satellite television, and cable television. Additionally, the devices in the system 500 can all be in communication with each other and the server 506 can act as an intermediary between the devices, although this does not have to be the case. Other arrangements are contemplated as well.

Operatively, when a user, such as a user of media device 502, is watching or otherwise experiencing media content presented on the display device 504, the user can utilize the client program to provide user-generated comments related to the media content or otherwise. The media content can be a video clip, audio clip, text content, still image content, advertising content, promotional content, sampling content, or other content. For example, the user can be watching an advertisement for a car and can decide to comment on the advertisement. When the user decides that he or she wants to make a comment, the user can utilize the media device 502 to access the client program to comment on the advertisement. The user can type in the comment or speak the comment and the client program can be configured to receive it.

The comments that are generated at each of the set top boxes and displayed in the overlay can be utilized by the server 506 for determining advertisements to be presented with the overlay and the media content. For example, the comments can be analyzed, including natural language synthesis techniques, to determine an advertisement that is appropriate based on the particular comment that is being made.

In one embodiment, comment analysis engine 525 can be utilized to facilitate the determination of the advertisement. The engine 525 can be resident on the server 506 and/or can be remotely accessible by the server. The engine 525 can utilize libraries, language parsing and other techniques for synthesizing the comments. Keyword searches can also be used for determining the advertisement that corresponds to the comment. In one embodiment, marketing parameters can be determined based on the comments and then remote media servers, such as servers 550, can be queried for particular advertisements.

Figure 6:
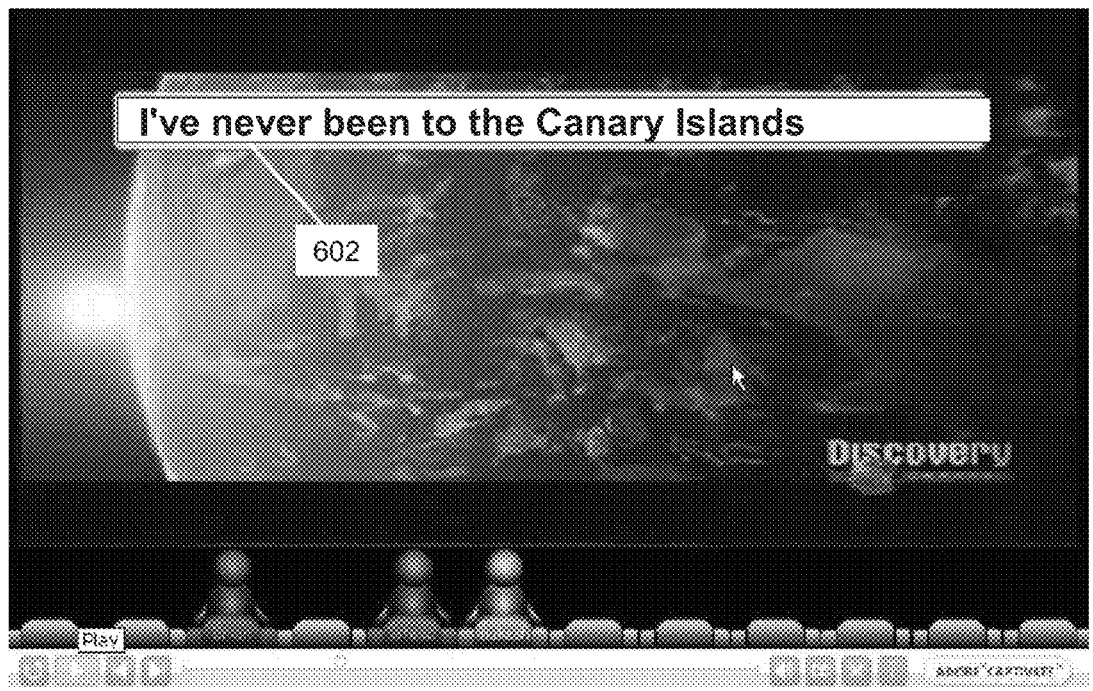
FIGS. 6-13 depict screenshots presented by a communication device of the systems of FIGS. 1-2 and 5.
Figure 7:
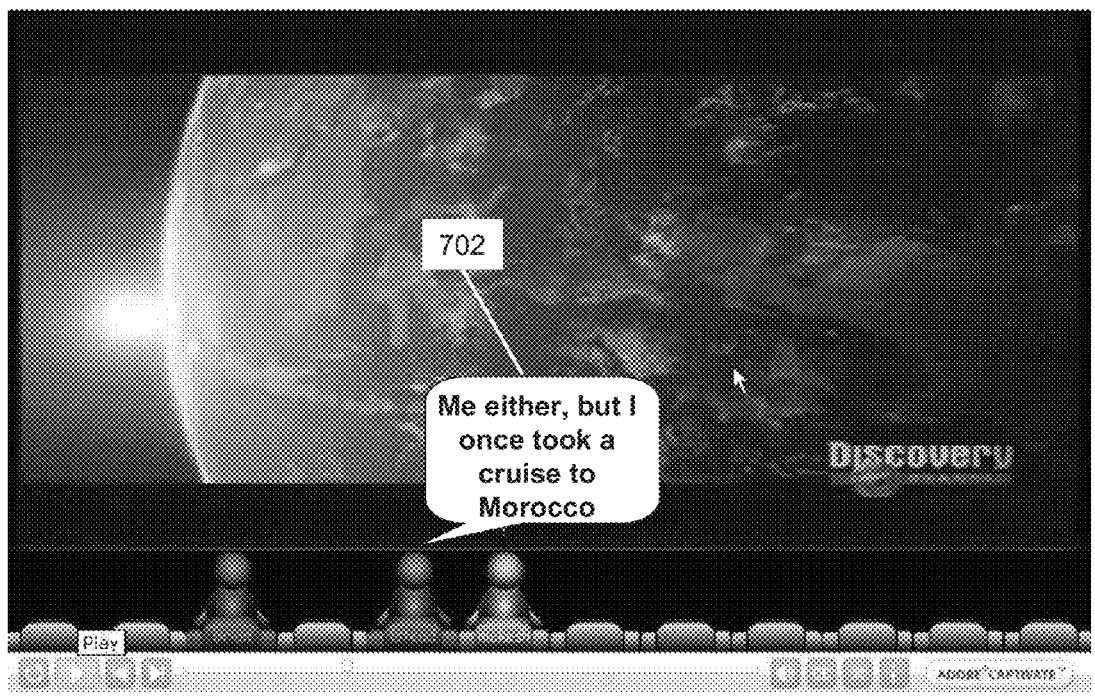
Figure 8:
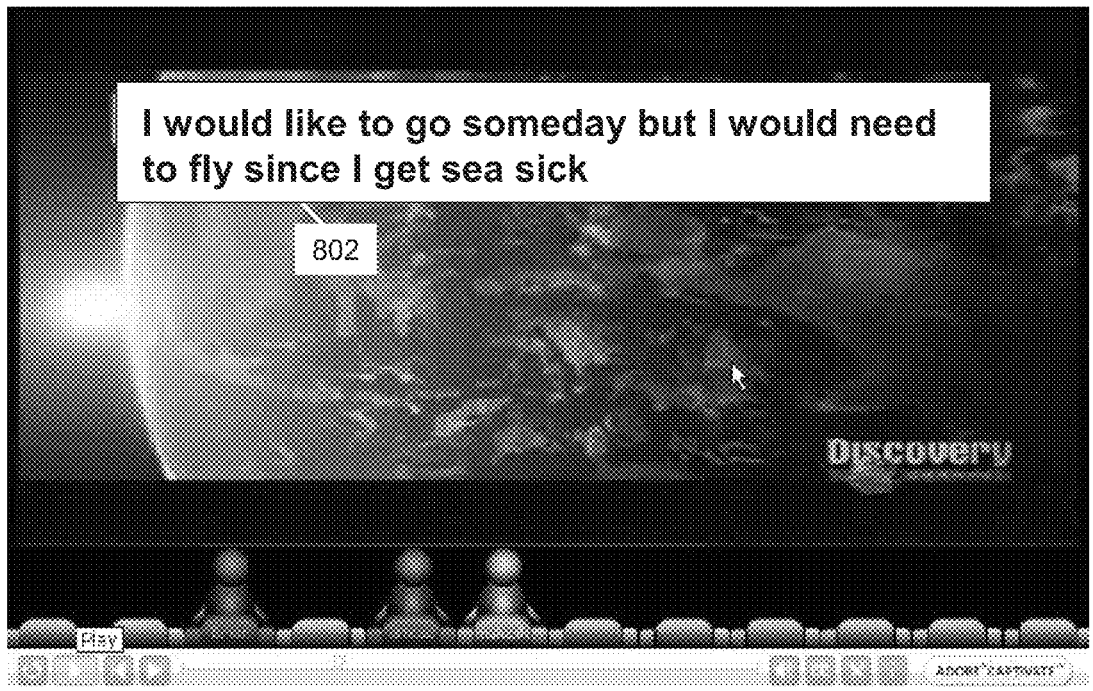

Referring now also to FIG. 6, a screenshot 600 illustrating a first user of a first set top box entering a comment during the presentation of media programming or content is shown. The screenshot 600 depicts the first user who has selected an option to make a comment on the subject matter of the programming. The option presents the user with a text box 602 in which the user can type in his or her comment. This comment can be shown in this form or as a balloon text coming from the avatar of the particular user as shown in the overlay. Referring now also to FIG. 7, a screenshot 700 which displays a second comment by a second user at a second set top box is illustratively shown. The screenshot 700 shows a caption box 702, which displays the captured text associated with the preview that was input by the user. Referring now to the screenshot 800 of FIG. 8, a third comment (from the first set top box) is received and presented in the overlay. The comments can be shown in the overlay of each of the set top boxes and/or can be shown in select overlays, such as designating recipients or showing a comment in all overlays except the overlay of the user generating the comment. The comments can be associated with the particular users making the comments, such as using an overlay that resembles an audience with audience members being identified as particular users involved in the viewing of the media programming. The present disclosure also contemplates other forms of overlays being utilized and the particular design of the GUI can vary.

Once the user-generated comments are received by the client program, the client program can associate the comment with the media content and the media device 502 can transmit the user-generated comment and/or the media content to the server 506 and or to the other devices of the system 500.

When the server 506 receives the user-generated comment and/or other information associated with a user, the server 506 can be configured to determine marketing parameters of the media content based on the user-generated comment and/or attributes of the user making the comment. The marketing parameters can include, but are not limited to including, demographic parameters, psychographic parameters, popularity parameters, and promotional effectiveness parameters. The demographic parameters can be associated with the age, location, gender, race, income, and other attributes of users. Psychographic parameters can be associated with the personality, attitudes, values, lifestyle, and/or interests of the users. Popularity parameters can be utilized to indicate how popular a particular advertisement, promotion, or other media content is. Promotional effectiveness parameters can indicate how effective an advertisement or other promotion was to the user. In an embodiment, the marketing parameters can be associated with a product and/or service advertised by the media content.

In this example, the first and third comments are indirectly concerned with traveling but indicate that travel by sea is undesirable. The second comment indicates that travel by sea is desirable. Server 506 can analyze the various comments and determine one or more advertisements to be presented at the overlay of each of the first and second users.

Figure 9:
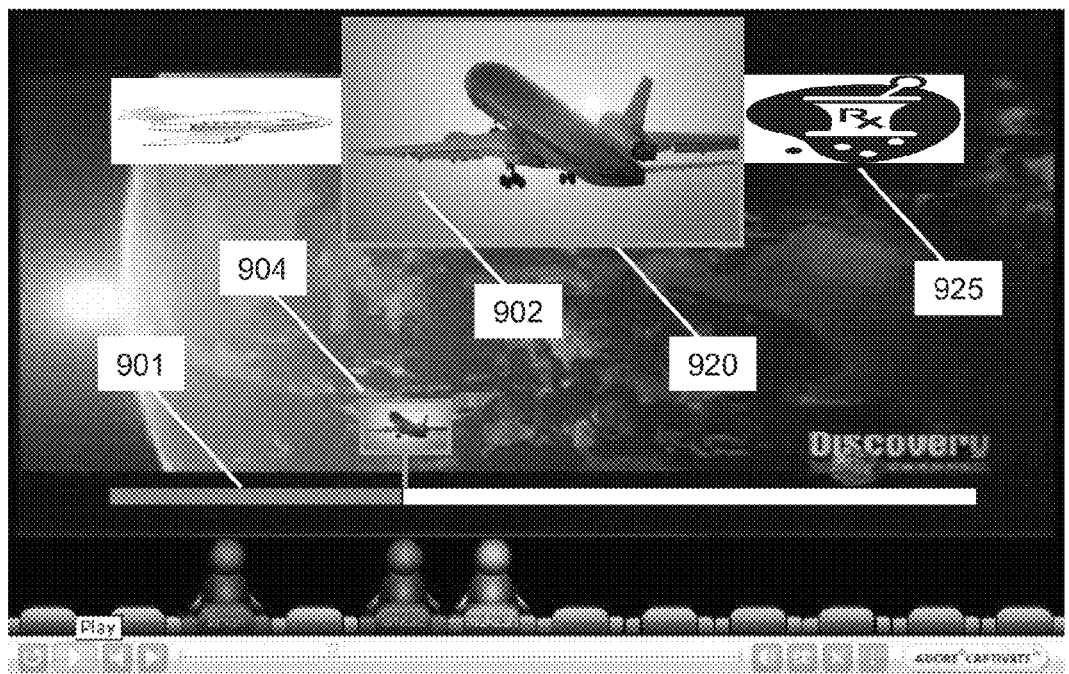

For instance, as shown in screenshot 900 of FIG. 9, a series of advertisements can be shown in an advertising GUI 902. In this example, GUI 902 is a horizontal carousel GUI that allows for rotation through the various advertisements with one of the advertisements being shown more prominently as the GUI is rotated. Frame 920 of GUI 902 depicts an advertisement for traveling by air which is based on an indication by the first user of a desire to travel, while frame 925 is an advertisement for medication for travel sickness which is also based on the comments made by the first user. In this example, the subject matter of the advertisements can differ and can be presented in the same GUI carousel.

Screenshot 900 also shows a timeline 901 that corresponds to the presentation of the media programming. An advertisement icon 904 can be placed along the time line 901 to correspond to the temporal position of the advertising, such as if the user would like to rewind the media programming to further view the advertisement. In one embodiment, the frame 920 can provide for an Internet link to the entity providing the particular advertisement. In another embodiment, the frame 920 can be interactive such that the user can click on the advertisement or a portion thereof to receive further information (such as via an email address associated with the set top box presenting the advertisement). The advertisement icon 904 can be a generic advertisement and/or can be based on one of the advertisements that were presented in the GUI 902, such as selecting the icon based on the frame that was viewed for the longest period of time.

Figure 10:
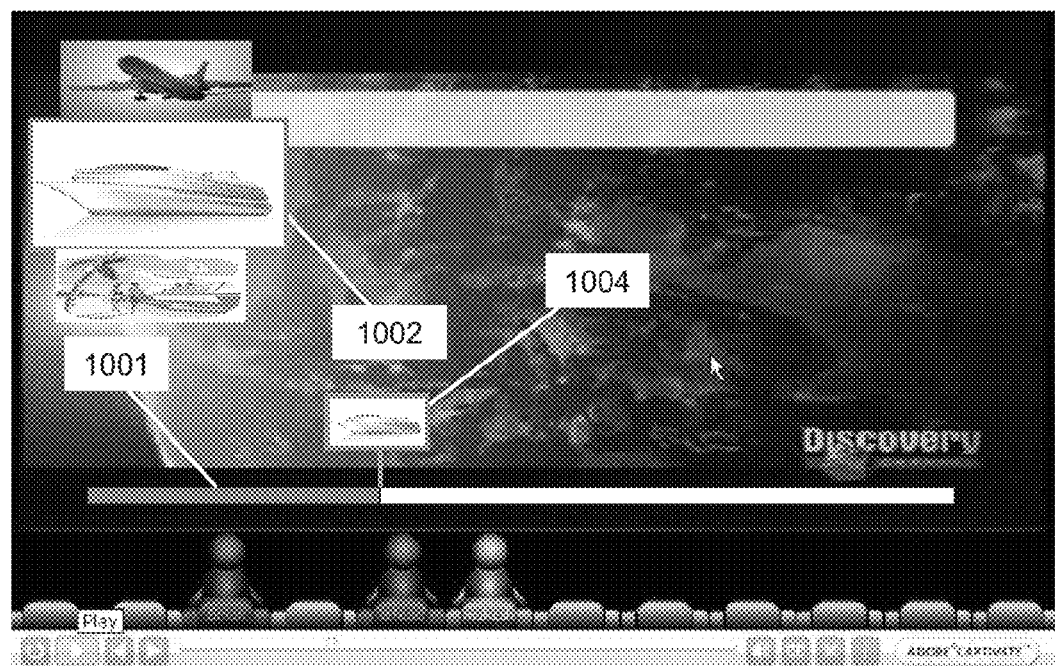
Figure 11:
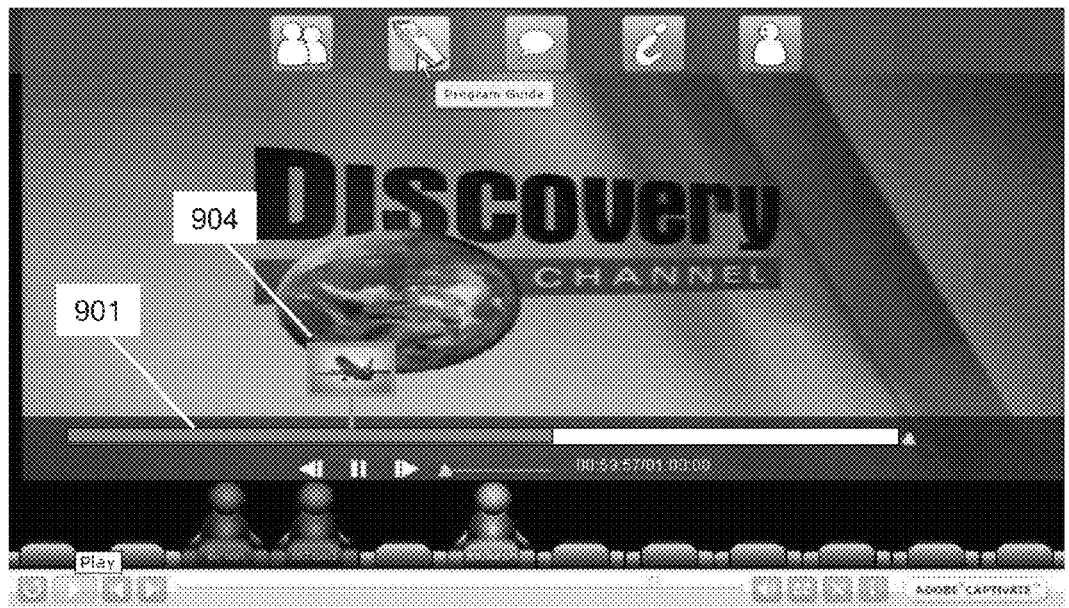
Figure 12:
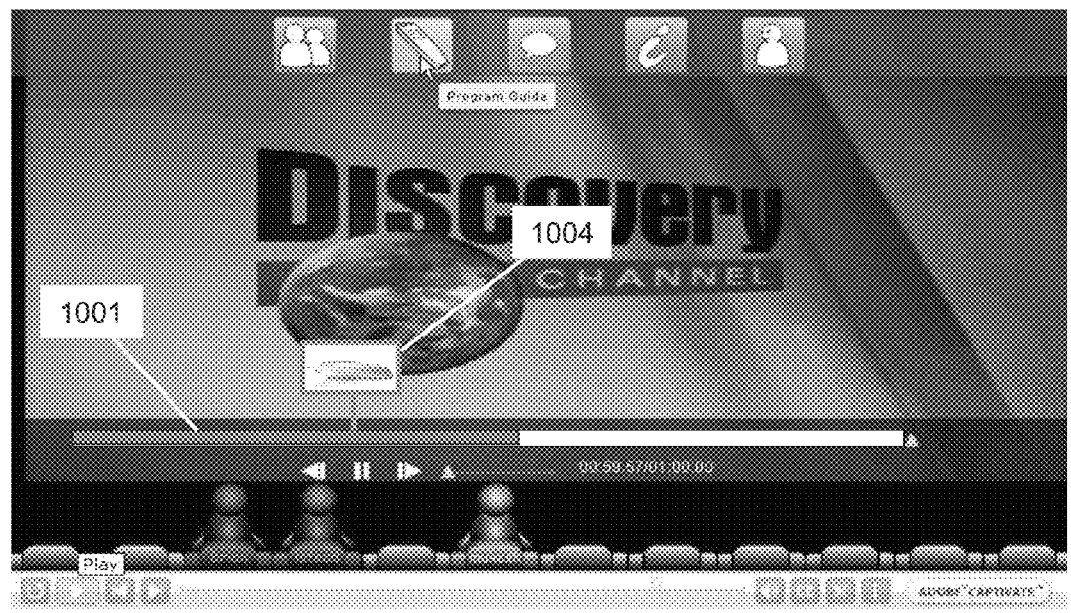
Figure 13:
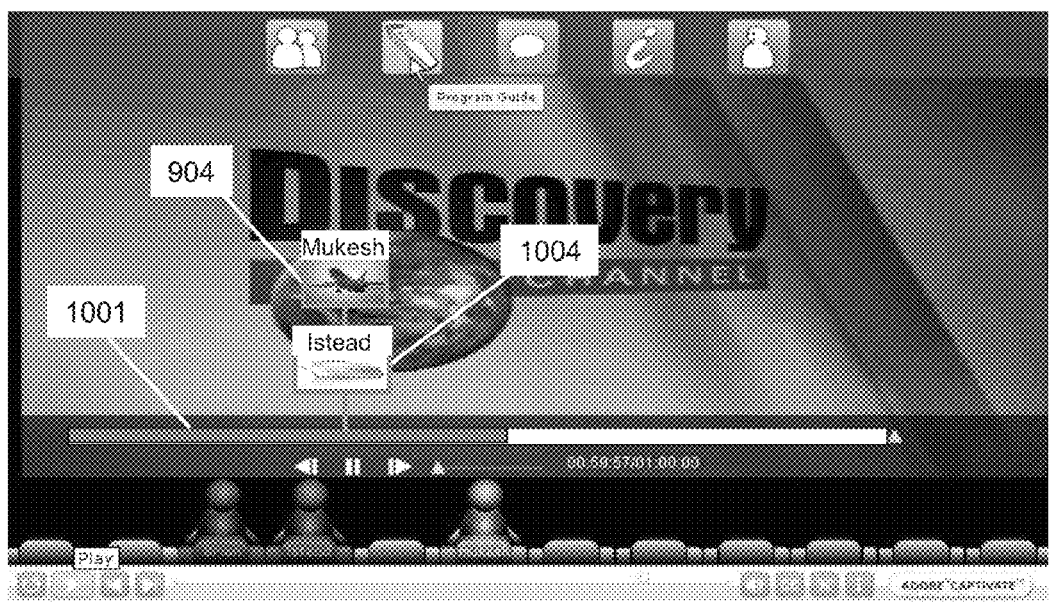

Screenshot 1000 of FIG. 10 illustrates an advertisement GUI 1002 (vertical as opposed to the horizontal GUI 902) which can be generated based on the second comment made by the second user at the second set top box. The second comments indicated previous sea travel by the second user so that the GUI 1002 can present frames with both air and sea ravel advertisements. Similarly, the time line 1001 can present the advertisement icon 1004. As shown in screenshot 1100 of FIG. 11 and screenshot 1200 of FIG. 12, the advertisement icons 904 and 1004 facilitate referral by the user to the advertisement by indicating its temporal position with respect to the media programming. In one embodiment, the particular advertisement shown to each set top box can be shown in the icon for that user, or, as in screenshot 1300 of FIG. 13, icons for each of the advertisements presented can be shown to all of the viewers. In one embodiment, the icons can include an indicator of the particular user to whom the advertisement was presented. In another embodiment, a link or other access to the advertisement of another user can be presented to each of the users. In such an example, each of the users could see the advertisements being generated for all of the users and could access those advertisements in the event that had interest in such advertisements.

The server 506 can be configured to analyze the marketing parameters and/or the content of the comment to determine the effectiveness of the media content. Additionally, third party users can also analyze the comments and/or marketing parameters to identify successful advertisements, unsuccessful advertisements, popular media content, and/or other relevant information. The analyses can be stored by the server 506 and can be utilized to improve the media content/advertisements. The third party users can alter the media content and/or generate new substitute content if user-generated comments indicate that a particular type of media content or advertisement was ineffective. Once the altered and/or new substitute content is generated, the server 506 can transmit the altered or substituted content to any of the devices in the system 500 for presentation. The users of the devices of system 500 can then provide comments on the altered and/or substitute content.

The devices in the system 500 can also be configured to transmit requests for the media content and user-generated comments from the other devices in the system 500. For example, continuing with the above example, if a user of media device 502 has made a comment on a particular advertisement or media program, the users of computing device 508, communications device 510, and media device 512 can request the comments and/or the media content from the media device 502. The request can be received first by the server 506, which can then retrieve the comments and/or media content from media device 502, or the devices can also directly connect to media device 502 to receive the comments and/or media content.

Once the requesting devices receive the comments and/or media content from the media device 502, users of the requesting devices can provide their own comments about the media content or even provide commentary on the other users' comments. Any comments generated by the requesting devices can similarly be transmitted to the server 506 or other devices of the system 500. The server 506 can determine marketing parameters based on the comments coming from the requesting devices as well.

Figure 14:
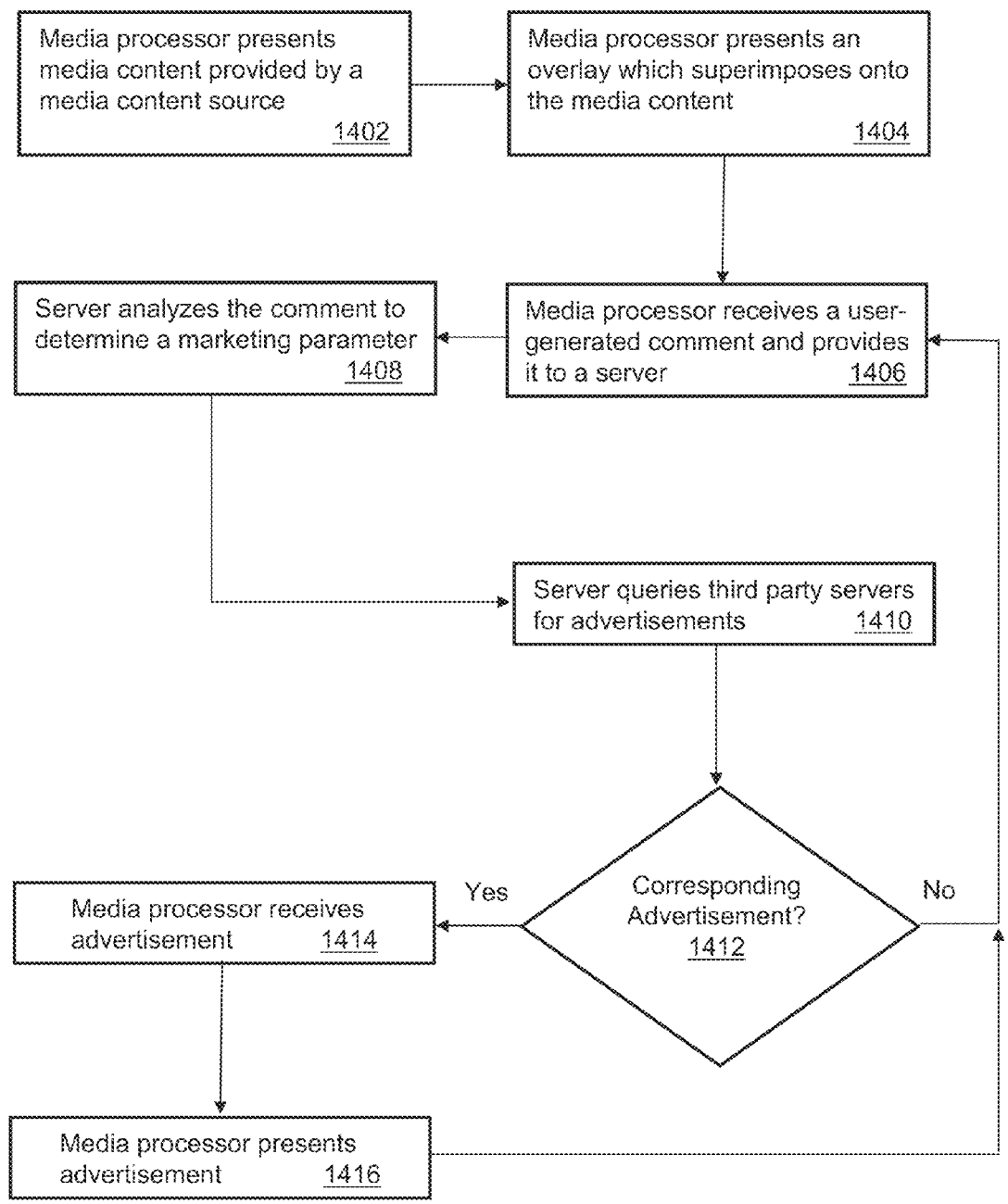
FIG. 14 depicts an illustrative embodiment of a method for managing marketing, which is operable in at least portions of one or more of the communication systems of FIGS. 1-2 and 5.

FIG. 14 depicts an illustrative method 1400 for managing marketing that is operable in portions of the communication systems of FIGS. 1-2 and FIG. 5. Method 1400 can begin with step 1402 in which a media processor, such as an STB, can present media content provided by a media content source. The media content can be video content, audio content, still image content, text content, advertisement content, and/or other promotional content. For example, the media content can be a VOD movie, regularly scheduled programming, a song and so forth.

At step 1404, the media processor can present an overlay that is superimposed onto the media content. For example, the media processor can access a client program, which can present the overlay. At step 1406, the media processor can receive user information and/or a user-generated comment, such as associated with the media content. The comment can be received through use of an input interface of the client program or otherwise. The user-generated comment, for example, can indicate a user's preferences regarding the media content, a user's dislike of the media content, and a user's suggestions for improving the media content. However, the present disclosure contemplates the comments being independent of the media content being presented. In one embodiment, once the comment is received, the media processor can associate the user-generated comment with the portion of the media content, such as through use of a comment icon that is positioned along a time line corresponding to the presentation of the media content.

At step 1408, the comment can be transmitted to a server where it is analyzed to determine marketing parameters. The analysis can be performed using various techniques, including natural language synthesis. An example of techniques and components that can be used to process the comments to generate the marketing parameters is disclosed in U.S. patent application Ser. No. 12/502,100 filed on Jul. 13, 2009 by Rege et al., entitled "Method For Analyzing, Deconstructing, Reconstructing, And Repurposing Rhetorical Content", the disclosure of which is hereby incorporated by reference. This application also incorporates by reference U.S. patent application Ser. No. 12/146,131, now U.S. Pat. No. 8,839,327.

In step 1410, the server can obtain one or more advertisements that correspond to the comment that was received. For example, the server can query one or more third party marketing servers using the marketing parameter to obtain the advertisements. In step 1412, a determination can be made as to whether a corresponding advertisement for the marketing parameters exists and whether it should be presented. If there is no corresponding advertisement or none is to be presented then method 1400 can return to step 1406 to receive additional comments. If on the other hand, a corresponding advertisement does exist then in step 1414 the media processor can receive the advertisement. For example, the third party server(s) can transmit a plurality of advertisements to the server where the server can select one or more of those advertisements and forward them to the media processor that generated the comment. The media processor can then present the advertisement(s) in step 1416.

The determination of advertisements to be presented to a media processor that has generated a comment can be done based on a number of factors in addition to the marketing parameter associated with the comment. For example, viewer behavior can be monitored as a factor in selecting the advertisement. For instance, the genre of programming that is watched at a particular media processor can be used as a factor in selecting the advertisement, such as a viewer that watches hunting shows may be presented with advertisements for vacations that include hunting even where the comment only pertained to going on a vacation.

The use of the overlay allows multiple users at different locations to share in the viewing experience, including sharing comments amongst each other. Based on those comments, targeted advertising can be provided to individual users or groups of users. Different advertising can be provided to different users simultaneously or in temporal proximity and/or can be provided to different users at different times. For example, a first user can receive a first set of advertisements, a second plurality of users can receive a second set of advertisements and one or more third users can receive no advertisements. In one embodiment, the presentation of advertisements can be based in part on user preferences, such as the position and style of the advertisements in the overlay and so forth.

Upon reviewing the aforementioned embodiments, it would be evident to an artisan with ordinary skill in the art that said embodiments can be modified, reduced, or enhanced without departing from the scope and spirit of the claims described below. For example, the determination of the marketing parameters can be performed by the set top box and/or the server. In one embodiment, advertising can be transmitted from the third party marketing servers directly to the set top boxes without transmitting the advertisements to the server.

In another embodiment, the server 506 and other devices of the system 500 can be configured to filter content from the comments. For example, if obscenities are found in the comments, the server 506 can filter and/or replace the obscene comments with comments that are not obscene. Additionally, the server 506 can be configured to compare comments and advertisements for multiple services and/or products and generate a report detailing which advertisements were the most effective. The report can also illustrate which demographics, psychographics, or other parameters are most responsive to a particular advertisement, whether it be positive, negative, or otherwise.

Other suitable modifications can be applied to the present disclosure without departing from the scope of the claims below. Accordingly, the reader is directed to the claims section for a fuller understanding of the breadth and scope of the present disclosure.

Figure 15:
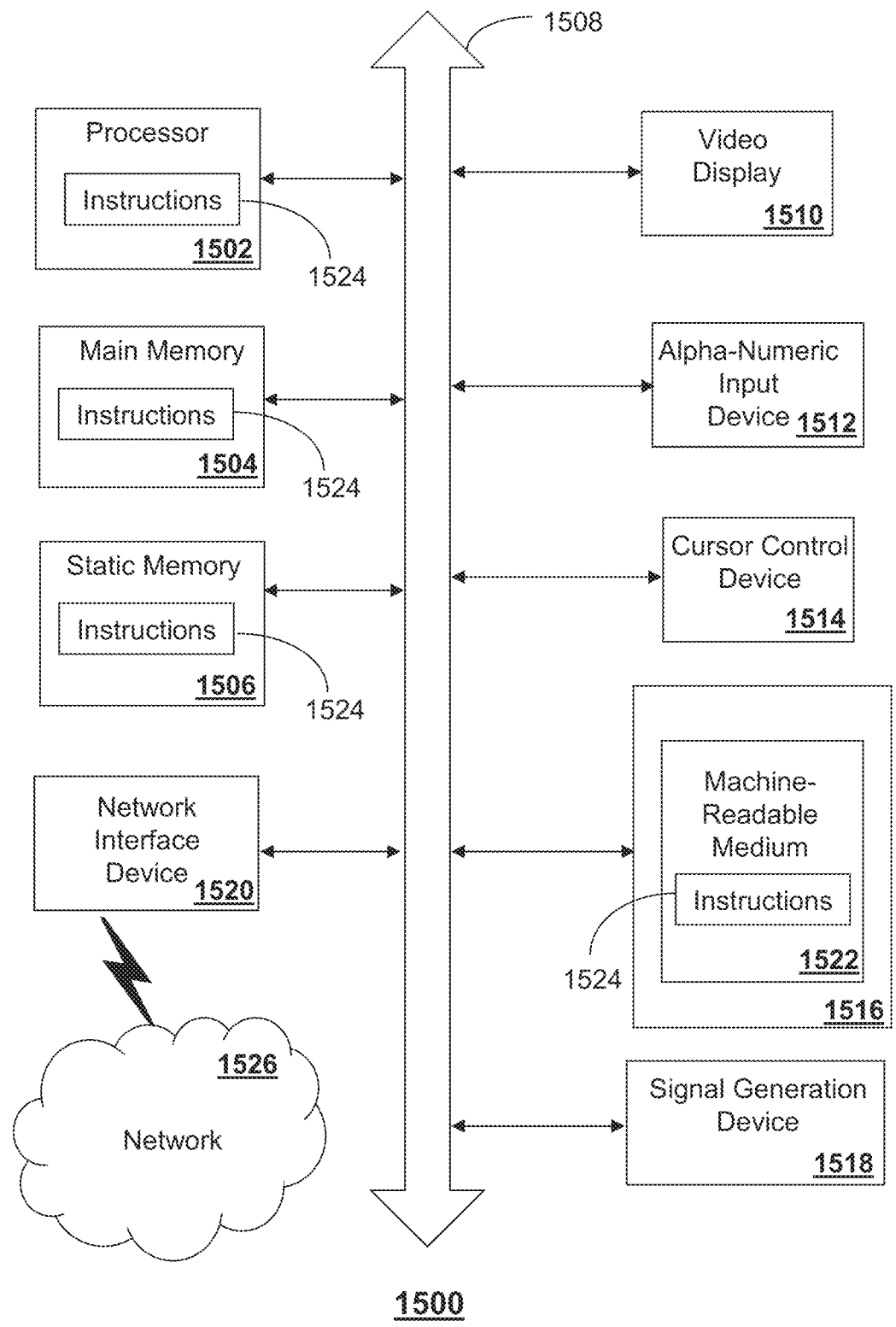
FIG. 15 is a diagrammatic representation of a machine in the form of a computer system within which a set of instructions, when executed, may cause the machine to perform any one or more of the methodologies discussed herein.

FIG. 15 depicts an exemplary diagrammatic representation of a machine in the form of a computer system 1500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1500 may include a processor 1502 (e.g., a central processing unit (CPU), a graphics processing unit (GPU, or both), a main memory 1504 and a static memory 1506, which communicate with each other via a bus 1508. The computer system 1500 may further include a video display unit 1510 (e.g., a liquid crystal display (LCD), a flat panel, a solid state display, or a cathode ray tube (CRT)). The computer system 1500 may include an input device 1512 (e.g., a keyboard), a cursor control device 1514 (e.g., a mouse), a disk drive unit 1516, a signal generation device 1518 (e.g., a speaker or remote control) and a network interface device 1520.

The disk drive unit 1516 may include a machine-readable medium 1522 on which is stored one or more sets of instructions (e.g., software 1524) embodying any one or more of the methodologies or functions described herein, including those methods illustrated above. The instructions 1524 may also reside, completely or at least partially, within the main memory 1504, the static memory 1506, and/or within the processor 1502 during execution thereof by the computer system 1500. The main memory 1504 and the processor 1502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1524, or that which receives and executes instructions 1524 from a propagated signal so that a device connected to a network environment 1526 can send or receive voice, video or data, and to communicate over the network 1526 using the instructions 1524. The instructions 1524 may further be transmitted or received over a network 1526 via the network interface device 1520.

While the machine-readable medium 1522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. .sctn.1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, the method comprising:
presenting, by a processing system comprising a processor, at a group of media presentation devices, an overlay superimposed onto a media program being presented by the group of media presentation devices;
receiving, by the processing system, a first comment generated by a first media presentation device of the group of media presentation devices during presentation of the media program;
receiving, by the processing system, a second comment generated by a second media presentation device of the group of media presentation devices during presentation of the media program;
determining, by the processing system, a first marketing parameter based on the first comment;
determining, by the processing system, a first targeted advertisement based on the first marketing parameter;
determining, by the processing system, a second marketing parameter based on the second comment;
determining, by the processing system, a second targeted advertisement based on the second marketing parameter;
presenting, by the processing system, at the first media presentation device the first targeted advertisement; and
presenting, by the processing system, at the second media presentation device the second targeted advertisement,
wherein the first targeted advertisement is presented only at the first media presentation device, and
wherein the second targeted advertisement is presented only at the second media presentation device.

2. The method of claim 1, wherein the system comprises a server remotely located from the group of media presentation devices.

3. The method of claim 1, further comprising presenting, by the processing system, at the group of media presentation devices, in the overlay superimposed onto the media program, a first indicator associated with the first comment and a second indicator associated with the second comment.

4. The method of claim 3, wherein the first indicator and the second indicator are presented in a timeline of the overlay.

5. The method of claim 4, wherein the first indicator is presented in the timeline at an approximate time when the first comment was generated.

6. The method of claim 4, wherein the second indicator is presented in the timeline at an approximate time when the second comment was generated.

7. The method of claim 1, wherein the first targeted advertisement differs from the second target advertisement.

8. A device, comprising:
a processing system including a processor; and
a memory that stores executable instructions that, when executed by the processing system, facilitate performance of operations, comprising:
facilitating, at a group of media processors, presentation of an overlay superimposed onto a media program being presented by the group of media processors;
detecting a generation of a first comment generated by a first media processor of the group of media processors during presentation of the media program;
detecting a generation of a second comment generated by a second media processor of the group of media processors during presentation of the media program;
determining a first marketing parameter based on the first comment;
obtaining a first targeted advertisement based on the first marketing parameter;
determining a second marketing parameter based on the second comment;
obtaining a second targeted advertisement based on the second marketing parameter;
facilitating, at the first media processor, a presentation of the first advertisement; and
facilitating, at the second media processor, a presentation of the second advertisement.

9. The device of claim 8, wherein the operations further comprise facilitating at the group of media processors a presentation in the overlay of a first indicator associated with the first comment and a second indicator associated with the second comment.

10. The device of claim 9, wherein the first indicator and the second indicator are presented in a timeline of the overlay.

11. The device of claim 10, wherein the first indicator is presented in the timeline at an approximate time when the first comment was generated.

12. The device of claim 10, wherein the second indicator is presented in the timeline at an approximate time when the second comment was generated.

13. The device of claim 8, wherein the first advertisement is presented only at the first media processor, and
wherein the second advertisement is presented only at the second media processor.

14. The device of claim 8, wherein the first advertisement differs from the second advertisement.

15. A machine-readable storage device, comprising executable instructions that, when executed by a processing system including a processor, facilitate performance of operations, comprising:
facilitating, at a group of media processors, a presentation of an overlay superimposed onto media content presented by the group of media processors;
detecting a generation of user-generated commentaries from the group of media processors during a presentation of the media content;
determining marketing parameters based on the user-generated commentaries;
requesting a group of promotions based on the marketing parameters; and
facilitating, at each of the group of media processors, a presentation of the group of promotions,
wherein each promotion of the group of promotions is presented only at a select one of the group of media processors from which the user-generated commentaries originated.

16. The machine-readable storage device of claim 15, wherein the operations further comprise facilitating, at the group of media processors, a presentation of indicators in the overlay associated with the user-generated commentaries.

17. The machine-readable storage device of claim 16, wherein the indicators are presented in a timeline of the overlay.

18. The machine-readable storage device of claim 17, wherein each indicator is presented in the timeline at an approximate time when a corresponding one of the user-generated commentaries was generated.

19. The machine-readable storage device of claim 15, wherein each promotion comprises an advertisement for a product correlated to a corresponding user-generated commentary.

20. The machine-readable storage device of claim 15, wherein each promotion comprises an advertisement for a service correlated to a corresponding user-generated commentary.

* * * * *